July 5, 1966
W. ROBINSON ET AL
3,258,836
AUGER ASSEMBLY FIXTURE
Filed April 1, 1964
2 Sheets-Sheet 1
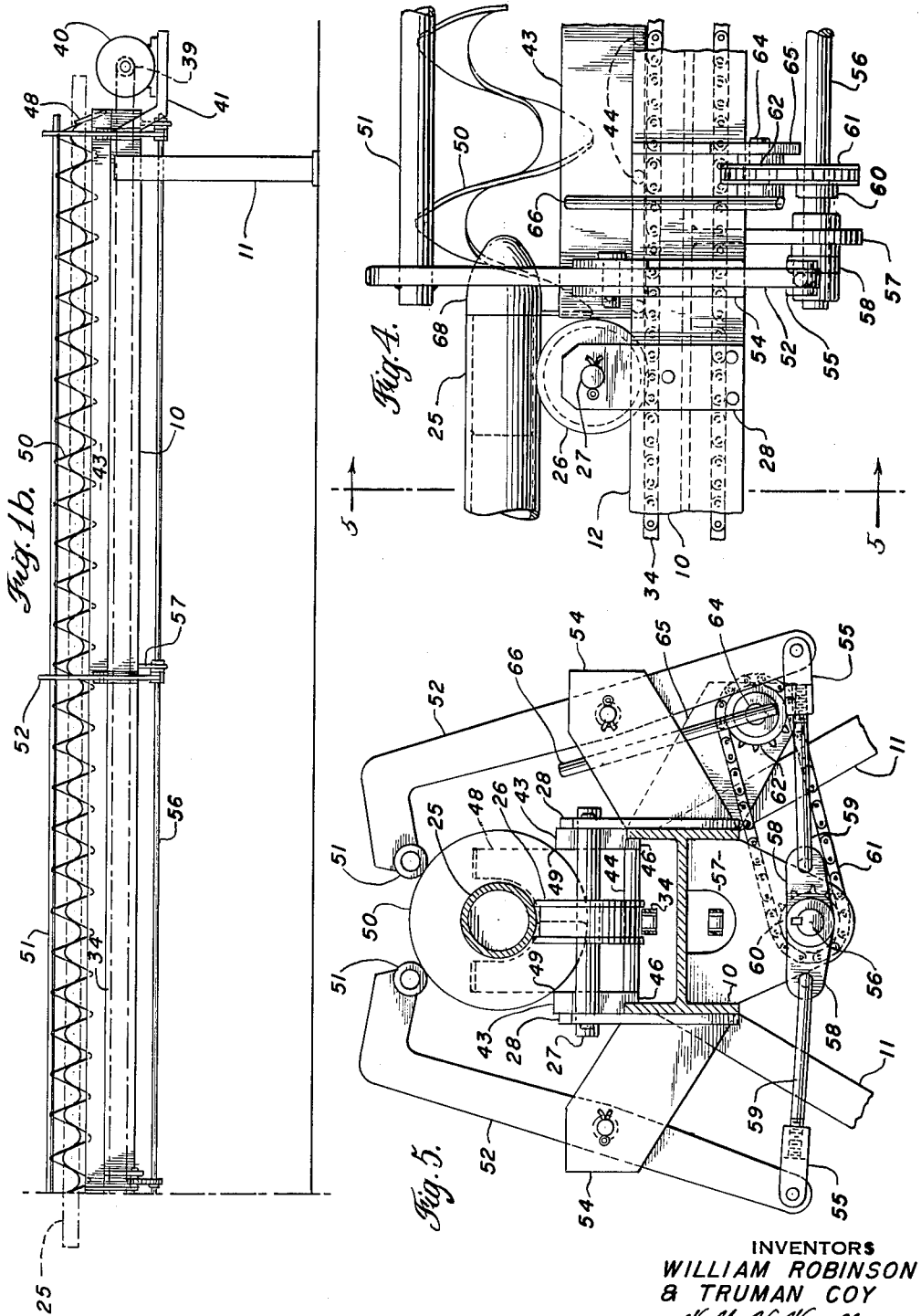
INVENTORS
WILLIAM ROBINSON
& TRUMAN COY
BY Walter V. Wright
AGENT

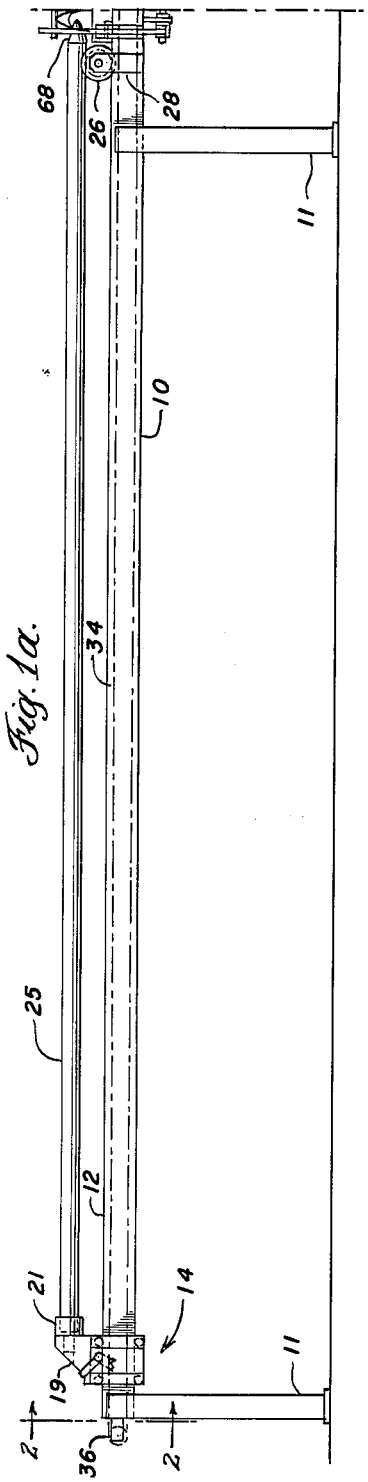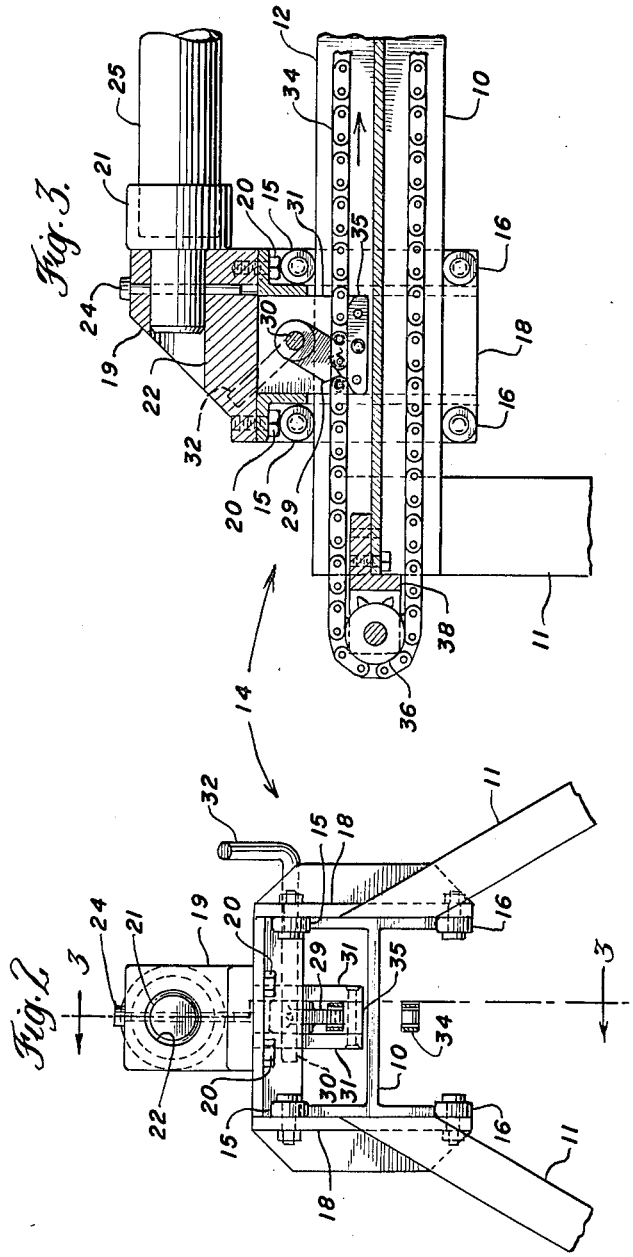

United States Patent Office 3,258,836
Patented July 5, 1966

3,258,836
AUGER ASSEMBLY FIXTURE
William Robinson, Honey Brook, and Truman Coy, New Holland, Pa., assignors to Sperry Rand Corporation, New Holland, Pa., a corporation of Delaware
Filed Apr. 1, 1964, Ser. No. 356,550
5 Claims. (Cl. 29—234)

This invention relates to the assembling of augers and is concerned, specifically, with mechanism to assemble augers from shafts and preformed helical auger flighting.

It is common practice for manufacturers of farm machinery, and other mechanisms in which augers are used, to purchase separate auger parts, namely: shafts and preformed helical auger flighting, and assemble these parts into augers as needed. The shipping, storing and handling of separate auger parts is considerably simpler than shipping, storing and handling assembled augers. The preformed helical auger flighting is generally handled and stored in bulk fashion with many units of flighting nested together to conserve space. Under these conditions, it is not uncommon for an auger flighting to become slightly deformed during handling and storage.

In assembling the augers, the shaft is inserted in the preformed helical auger flighting and the two parts are then welded together. While this is theoretically a simple process, in actual practice it is often an extremely difficult and time consuming operation to insert the shaft in the flighting. The inner helical edge of the flighting has substantially the same radius as the shaft on which it is to be mounted. It is impractical in the mass production of such coarse massive items as auger shafts and flighting to hold the shaft and flighting radii within exacting dimensional tolerances. Therefore, a certain percentage of the units are unavoidably close fitting. Overlapping of tolerance limits of the shaft and flighting, even slight deformation of the flighting or the inner edge of the flighting, or bending of the longitudinal axis of the helical flighting, creates considerable binding when it is attempted to insert the auger shaft through the flighting. The auger flighting is relatively flexible and resilient compared to the shaft. Any bending or "springing" of the flighting that occurs as the shaft enters a given convolution travels along the flighting and may create binding at some other previously free convolution. Consequently, the process of assembling augers has been the very laborious and time consuming one of working the flighting and shaft together inch by inch.

It is an object of this invention to provide mechanism for assembling augers which drastically reduces both the time and labor normally associated with the assembling operation.

It is another object of this invention to provide auger assembling mechanism adapted to assemble augers of a wide variety of lengths and diameters.

It is another object of this invention to provide mechanism for assembling augers from preformed helical flighting even though the flighting may have been deformed during handling or storage.

It is another object of this invention to provide auger assembling mechanism which is rugged, mechanically simple, easy to operate and requires virtually no maintenance.

These and other objects and advantages of this invention will be apparent upon reference to the following description and claims taken in conjunction with the accompanying drawings wherein:

FIG. 1a is a side elevational view of one half (the left half) of an auger assembling device constructed in accordance with the principles of the present invention;

FIG. 1b is a side elevational view similar to FIG. 1a showing the other half (the right half) of the auger assembling device;

FIG. 2 is a sectional view taken on the line 2—2 of FIG. 1a to an enlarged scale;

FIG. 3 is a fragmentary sectional view taken on the line 3—3 of FIG. 2;

FIG. 4 is a fragmentary side elevational view showing the details of construction at the right end of FIG. 1a to an enlarged scale; and FIG. 5 is a sectional view taken on the line 5—5 of FIG. 4.

Referring to the drawings in detail, the numeral 10 indicates an I-beam main frame member having a plurality of supporting legs 11. The upper edges 12 of the left portion (FIG. 1a) of I-beam 10 constitute tracks upon which a carriage 14 rides.

As best seen in FIGS. 2 and 3, carriage 14 is a rigid structure having four upper rollers 15 riding on the upper edges 12 of the flanges of I-beam 10 and four lower rollers 16 engaging and riding on the lower edges of the flanges of I-beam 10. The side plates 18 of the carriage lie closely along the respective outer sides of the I-beam. In this manner, the combined sets of rollers 15 and 16 and side plates 18 positively and rigidly lock carriage 14 to the track portion 12 of I-beam 10 while rendering the carriage freely movable along the track on the rollers. A socket block 19 is attached to the top of carriage 14 by a series of bolts 20. An auger shaft adapter member 21 is carried in socket bore 22 in the block 19. A locking pin 24 holds the adapter in the bore. The adapter 21 supports one end of an auger shaft 25.

As best seen in FIGS. 1a and 4, the other end of auger shaft 25 is supported on a roller 26 journalled on a cross shaft 27 which is supported in stanchions 28 fixedly attached to the respective sides of I-beam 10 near the center of the elongated frame. In this manner, the auger shaft 25 is supported in a predetermined position which is related to the diameter of the shaft and the diameter of the auger flighting to be mounted thereon. To accommodate an auger shaft of a different diameter, the shaft adapter 21 would be replaced by an adapter of another size.

As best seen in FIGS. 2 and 3, a latch pawl 29 is disposed within carriage structure 14. The latch pawl is carried on a shaft 30 which is journalled in a pair of lugs 31 depending from the top plate of carriage structure 14. The shaft 30 has a handle portion 32 projecting to one side of carriage 14. It will be apparent in FIG. 3 that by manually swinging handle 32 clockwise, the teeth of latch pawl 29 will be raised from the position shown to a position out of engagement with endless chain 34. It will also be apparent in FIG. 3 that movement of the upper reach of chain 34 to the right, with latch pawl 29 in the position shown, will effect driving engagement between chain 34 and carriage 14 through the latch pawl 29. A block 35, carried by and disposed between lugs 31, engages the underside of the upper reach of chain 34 and prevents the chain from dropping out of engagement with pawl 29 in the event of the development of slack in the chain.

Endless chain 34 is entrained about a pair of sprockets disposed at the extreme ends of the I-beam frame member 10. The sprocket 36 (FIG. 3) at the extreme left end of the frame is fixedly journalled in a yoke member 38 bolted to the I-beam 10. The sprocket 39 (FIG. 1b) is mounted on the shaft of a motor 40 which is mounted on a platform 41 supported from I-beam 10. Motor 40 operates to drive the upper reach of chain 34 from left to right as seen in FIGS. 1a, 1b, 3 and 4.

As best seen in FIGS. 1b, 4 and 5, along the right half of the device a pair of elongated auger flighting supporting members 43 are disposed on the upper edges 12 of the flanges of I-beam 10. The members 43 are interconnected and spaced apart by a plurality of cross members 44, thereby forming a rigid ladder-like structure which may be lifted off I-beam 10 as a unit. The lower edges 46 (FIG. 5) of members 43 are longitudinally notched to facilitate accurate positioning of the members 43 on the I-beam flanges. At the extreme right end of support members 43 (FIG. 1b) an auger flighting end stop member 48 is disposed. Stop 48 is welded or otherwise rigidly attached to members 43. The upper inner edges 49 (FIG. 5) of members 43 are straight, parallel to each other and parallel to the axis of an auger shaft supported on adapter 21 and roller 26. The lateral spacing between edges 49 is less than the outside diameter of the auger flighting 50 intended to be supported thereon, as may be seen in FIG. 5. The relationship between flighting supporting edges 49, roller 26 and shaft adapter 21 is such that the longitudinal axis of a helical flighting unit supported on edges 49 is coaxial with the axis of an auger shaft supported on roller 26 and shaft adapter 21. By substituting different flighting supports 43–44 and different shaft adapters 21, a wide range of shaft and flighting diameter may be accommodated by the device.

When the longitudinal axis of the helical flighting 50 is straight and coaxial with the axis of shaft 25, each convolution of flighting will engage both edges 49. Conversely, if each convolution of auger flighting engages both edges 49, the flighting axis will be straight and coaxial with the axis of shaft 25. A pair of clamping rods 51 extend the length of flighting 50 and are disposed generally above the flighting, as may be seen in FIGS. 1b and 5. The clamping rods 51 are rigidly carried on the upper ends of arms 52 which are pivoted near their mid-points to supports 54 welded to I-beam 10. The lower ends of arms 52 extend below I-beam 10 and pivotally carry threaded socket members 55 on their lower ends. A clamp actuating shaft 56 is journalled in plates 57 depending from the underside of I-beam 10. Shaft 56 extends underneath I-beam 10 the full length of clamping rods 51. At each pair of arms 52 a pair of lugs 58 are keyed to shaft 56. The lugs 58 extend from opposite sides of shaft 56 toward the respective arms 52. A rod 59 is hooked into each lug 58 and has its other end threaded into one of the sockets 55. It will be seen in FIG. 5, that rotation of shaft 56 clockwise will act through lugs 58, rods 59 and sockets 55 to pull the lower ends of arms 52 from the positions shown toward I-beam 10. This will swing the upper ends of the arms 52, with their clamping rods 51 outwardly away from I-beam 10 and the auger flighting 50 supported thereon. From this outward, or disengaged position, the clamping rods 51 will be moved back into engagement with flighting 50 as shown in FIG. 5 upon rotation of shaft 56 counterclockwise back to the position shown in FIG. 5.

Rotation of shaft 56 is effected through a sprocket 60 keyed to the shaft, an endless chain 61 entrained around sprocket 60 and around a drive sprocket 62. The drive sprocket 62 is journalled on a shaft 64 mounted on a plate 65 attached to I-beam 10. Drive sprocket 62 is rotated by a manually operable arm 66 rigidly attached to sprocket 62.

The auger assembling device is prepared for operation on an auger of certain shaft and flighting diameters by setting the proper flighting supporting members 43 on I-beam 10 at the right end thereof and by inserting the proper shaft adapter 21 in carriage 14. A preformed flighting unit 50 is then deposited on members 43 with the extreme right end thereof in engagement with end stop member 48. The flighting is then pressed down into tight engagement with supporting edges 49 of members 43 by clamping rods 51. Minute adjustments of clamping rods 51 are afforded by the threaded sockets 55 at the lower ends of the clamping rod arms 52. The clamping rods serve the two functions of straightening deformed flighting by pressing it into engagement with straight edges 49 and holding the auger flighting in a fixed position on the frame 10. An auger shaft 25 is inserted in shaft adapter 21 and the other end is deposited on roller 26. A bullet-like plug 68 (see FIG. 4) is inserted in the end of auger shaft 25 to facilitate movement of the shaft through the convolutions of auger flighting 50. The handle 32 on carriage 14 is then moved to the position shown in FIG. 3. This engages the teeth of latch dog 29 with carriage drive chain 34. Motor 40 is then actuated to drive chain 34, and thereby carriage 14, from the position shown in FIG. 1a toward roller 26. This drives auger shaft 25 through flighting 50 to the position shown in phantom lines in FIG. 1b. The clamping rods 51 are then moved to their disengaged positions and the assembled auger is lifted off members 43. The bullet plug 68 is removed from the end of auger shaft 25, and carriage 14 is disengaged from chain 34 by operation of handle 32 and then moved back to the position shown in FIG. 1a.

It should be noted in FIG. 5 that the lugs 58, rods 59 and sockets 55 constitute an over center type lock linkage. The geometry of this linkage is such that when the parts are in the positions shown in FIG. 5, lever 66 must be manually moved clockwise to unlock the clamp actuating linkage.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A device for assembling an auger from a shaft and preformed helical auger flighting, said device comprising, an elongated frame, a track on said frame, means on said frame at one end of said track for guiding and supporting one end of an auger shaft, a carriage on said track and movable therealong, means on said carriage for supporting the other end of an auger shaft, means for supporting preformed helical auger flighting on said frame adjacent said one end of said track and extending in the same general direction as said track, clamping means on said frame engageable with auger flighting on said flighting supporting means and operable to clamp said flighting in a fixed position with the axis of the helical flighting straight and coaxial with the axis of a shaft whose ends are supported, respectively, on said carriage and said shaft guiding and supporting means, and drive means on said frame engageable with said carriage to drive the carriage along said track toward said coaxially clamped auger flighting thereby driving said shaft longitudinally through said flighting.

2. A device for assembling an auger as recited in claim 1 wherein said means for supporting preformed helical auger flighting on said frame comprises, a pair of elongated members on said frame each having a straight upper edge, said members extending in the direction of elongation of said frame and being spaced apart laterally a distance less than the diameter of said preformed helical auger flighting.

3. A device for assembling an auger as recited in claim 2 wherein said clamping means comprises a pair of straight rods extending in the direction of elongation of said frame, means mounting each of said rods on said frame for pivotal movement between a clamping position wherein the rods engage opposite sides of the upper portion of auger flighting supported on said straight upper edges of said flighting supporting members and a release position wherein said rods are disengaged from said flighting, and lever means drivingly connected to said rod mounting means to move said rods between their clamping and release positions.

4. A device for assembling an auger as recited in claim 3 wherein over-center lock linkage interconnects said lever means and said rod mounting means to lock said rods in clamping position, said linkage including adjustable members operable to adapt said clamping means for auger flighting of various diameters.

5. A device for assembling an auger as recited in claim 1 wherein said carriage drive means comprises a pair of sprockets respectively journalled on the ends of said frame, an endless chain entrained about said sprockets and having a drive reach extending therebetween, a motor drivingly connected to one of said sprockets for driving said endless chain, and releasable latch means carried on said carriage and engageable with said chain to drivingly lock said chain to said carriage.

References Cited by the Examiner
UNITED STATES PATENTS

| | | | |
|---|---|---|---|
| 2,642,655 | 6/1953 | Davis et al. | 29—234 |
| 2,691,817 | 10/1954 | Rainone et al. | 29—234 |
| 3,039,181 | 6/1962 | Sawdey | 29—240 X |

WILLIAM FELDMAN, *Primary Examiner.*

J. C. PETERS, *Assistant Examiner.*